(12) United States Patent
Kirmer

(10) Patent No.: US 10,773,477 B2
(45) Date of Patent: Sep. 15, 2020

(54) REPAIR APPARATUS FOR MATERIAL GUIDE

(71) Applicant: Lodestone PatchWorks LLC, Blackwell, TX (US)

(72) Inventor: Robert Lynn Kirmer, Wichita, KS (US)

(73) Assignee: Lodestone Patchworks LLC, Blackwell, TX (US)

( * ) Notice: Subject to any disclaimer, the term of this patent is extended or adjusted under 35 U.S.C. 154(b) by 0 days.

(21) Appl. No.: 16/374,825

(22) Filed: Apr. 4, 2019

(65) Prior Publication Data

US 2019/0224932 A1 Jul. 25, 2019

Related U.S. Application Data

(60) Provisional application No. 62/719,995, filed on Aug. 20, 2018.

(51) Int. Cl.
*B29C 73/10* (2006.01)
*B29C 73/30* (2006.01)
(Continued)

(52) U.S. Cl.
CPC .......... *B29C 73/12* (2013.01); *E04G 23/0203* (2013.01); *B29C 65/002* (2013.01);
(Continued)

(58) Field of Classification Search
CPC ......... Y10T 29/49732; Y10T 29/49734; Y10T 29/49735; Y10T 29/49739; Y10T 428/20;
(Continued)

(56) References Cited

U.S. PATENT DOCUMENTS 2,781,939 A * 2/1957 Lockwood ............ F24H 9/0005
220/230
5,009,179 A * 4/1991 Johnson .................. B63B 43/16
114/229
(Continued)

FOREIGN PATENT DOCUMENTS

DE 4104574 A1 * 8/1992 ............. B63B 43/16
EP 3165442 A1 * 5/2017 ............. B63B 43/16
(Continued)

OTHER PUBLICATIONS

"Product Review Magnetic Patch," Grain Journal, dated Jan./Feb. 2018, vol. 46, No. 1, pp. 1-7 and 246.

*Primary Examiner* — Philip C Tucker
*Assistant Examiner* — Brian R Slawski
(74) *Attorney, Agent, or Firm* — Stinson LLP

(57) ABSTRACT

A repair apparatus is configured to repair a hole in a curved wall portion of a material guide. The repair apparatus includes a patch body that can conform to the shape of the curved wall portion and a retainer that non-destructively holds the patch body in place on the wall portion over the hole. In certain embodiments, the retainers are magnets or straps. The patch body can be flexible so that it can be adjusted to conform to the shape of curved wall portions of various sizes and curvatures. The patch body can include a wear-resistant inner surface. In some embodiments, the patch body includes an outer shell and a wear-resistant inner liner connected to the shell. The liner can have one side that is unattached to the shell.

19 Claims, 12 Drawing Sheets

(51) Int. Cl.

| | |
|---|---|
| *B29C 65/56* | (2006.01) |
| *B29C 65/76* | (2006.01) |
| *B29C 65/00* | (2006.01) |
| *B29C 65/78* | (2006.01) |
| *F16L 55/168* | (2006.01) |
| *B32B 7/025* | (2019.01) |
| *B32B 37/00* | (2006.01) |
| *B32B 37/10* | (2006.01) |
| *B29C 73/12* | (2006.01) |
| *E04G 23/02* | (2006.01) |

(52) U.S. Cl.
CPC ............ *B29C 65/562* (2013.01); *B29C 65/76* (2013.01); *B29C 65/785* (2013.01); *B29C 66/8244* (2013.01); *B29C 73/10* (2013.01); *B29C 73/30* (2013.01); *B32B 7/025* (2019.01); *B32B 2037/1081* (2013.01); *B32B 2556/00* (2013.01); *F16L 55/1683* (2013.01)

(58) Field of Classification Search
CPC ......... Y10T 137/0441; Y10T 137/0452; B29C 73/00; B29C 73/10; B29C 73/105; B29C 73/12; B29C 73/24; B29C 73/30; B29C 73/14; B29C 65/00; B29C 65/56; B29C 65/562; B29C 65/72; B29C 65/76; B29C 65/002; B63B 43/16; F16L 55/1683; F16L 55/17; F16L 55/163; B29K 2105/256; B32B 37/10; B32B 2037/1081; B32B 2556/00; Y10S 428/90; Y10S 206/818; Y10S 454/904

USPC .... 156/60, 71, 90, 91, 92, 94, 98, 196, 212, 156/213, 214, 215, 272.2, 290, 293, 294, 156/297; 138/97, 98, 99; 428/63; 29/402.01, 402.09, 402.11, 402.12, 29/402.14; 264/36.1, 36.15, 36.16; 285/15

See application file for complete search history.

(56) References Cited

U.S. PATENT DOCUMENTS

| | | | | |
|---|---|---|---|---|
| 5,072,684 | A * | 12/1991 | Pryor | B63B 43/16 114/229 |
| 5,165,356 | A * | 11/1992 | Williams | B63B 43/16 114/229 |
| 5,195,446 | A * | 3/1993 | Riddell | B63B 43/16 114/227 |
| 5,685,252 | A * | 11/1997 | Prysner | B63B 43/16 114/229 |
| 5,735,227 | A * | 4/1998 | Goulding | B63B 43/16 114/227 |
| 2017/0323715 | A1* | 11/2017 | Chewins | B29C 39/123 |
| 2018/0170164 | A1* | 6/2018 | Wingard | B32B 3/08 |

FOREIGN PATENT DOCUMENTS

| | | | | |
|---|---|---|---|---|
| GB | 2244680 A | * | 12/1991 | ............. B63B 43/16 |
| GB | 2405617 A | * | 3/2005 | ............. B63B 43/16 |
| WO | WO-9204574 A1 | * | 3/1992 | ............. B63B 43/16 |

\* cited by examiner

REPAIR APPARATUS FOR MATERIAL GUIDE

CROSS-REFERENCE TO RELATED APPLICATION

This application claims priority to U.S. Provisional Patent Application Ser. No. 62/719,995, filed Aug. 20, 2018, and entitled "Method and Apparatus for Repairing Material Guide," which is hereby incorporated by reference in its entirety.

FIELD

This disclosure generally pertains to an apparatus for repairing holes in a wall portion of a guide (e.g., a conveyor, an auger, a chute, a pipe, a tube, a trough, a spout, etc.) for guiding movement of dry fluidizable or flowable material such as granular or pelletized material, powder, seeds, grain, or the like.

BACKGROUND

Guides such as conveyors, augers, chutes, pipes, tubes, troughs, or spouts are used to guide flowable materials such as grain, seed, aggregate, coal, minerals, etc. Over time, holes can form in the wall portion of a guide from wear. Historically these holes are patched with, for example, tape, adhesives, wood, wire, chemically-cured or Ultraviolet-cured resins, or clamp repairs that require tools for installation.

SUMMARY

In one aspect, a repair apparatus configured to repair a hole in a steel curved wall portion of any of a plurality of material guides of different diameters comprises a patch body having a first end portion and a second end portion spaced apart along a length and a first longitudinal edge margin and a second longitudinal edge margin spaced apart along a width. The patch body is configured to be fitted onto the wall portion of any of the material guides whereby the patch body generally conforms to the wall portion and covers the hole. At least one magnet is connected to the patch body and configured to fixedly retain the patch body on the wall portion to cover the hole.

In another aspect, a repair apparatus configured to repair a hole in a curved wall portion of any of a plurality of material guides of different diameters comprises a patch body having a first end portion and a second end portion spaced apart along a length, a first longitudinal edge margin and a second longitudinal edge margin spaced apart along a width, and an inner surface and an outer surface spaced apart along a thickness. The patch body is configured to be secured to the wall portion of any of the material guides so that the inner surface opposes and generally conforms to the wall portion and the patch body covers the hole. The inner surface of the patch body being formed from a wear-resistant material.

In still another aspect, a repair apparatus configured to repair a hole in a curved wall portion of any of a plurality of material guides of different diameters comprises a patch body having a first end portion and a second end portion spaced apart along a length and a first longitudinal edge margin and a second longitudinal edge margin spaced apart along a width. The patch body is generally arcuate along the width and is resiliently deformable to increase a widthwise radius of curvature of the patch body whereby the patch body can be selectively adjusted to generally conform to a curvature of the wall portion of any of the plurality of material guides to cover the hole. At least one retainer is attached to the patch body. The at least one retainer is configured to secure the patch body onto the respective material guide so that the patch body conforms to the curvature of the respective wall portion and covers the respective hole.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Referring to FIGS. 1-6, an exemplary embodiment of a patch (broadly, an apparatus or repair apparatus) for repairing a damaged wall portion W of a material guide G is generally indicated at reference number 10. Certain methods of using the illustrated patch 10 to repair a hole in a curved wall portion W (broadly, a wall portion) of a material guide will be understood in view of the drawings and description herein. The repair apparatus 10 can be used in one or more embodiments to repair a wall portion W (e.g., a wall portion of a conveyor, an auger, a chute, a pipe, a tube, a trough, a spout etc.) utilized to transport dry (fluidizable or flowable) materials (e.g., granular materials, pelletized materials, powder, etc.) including but not limited to grain, aggregate, minerals, coal, and seed. In one or more embodiments, the illustrated repair patch 10 can be operatively installed on the wall portion W by one person. For example, a single person can manually install the apparatus 10 on the guide G without the need of tools, fasteners, or adhesives. In certain embodiments, a patch 10 used to repair the wall portion W of the guide G is adjustable (e.g., the repair patch is bendable or flexible, e.g., resiliently bendable or flexible) to fit wall portions having different curvatures or diameters without need for tools, fasteners or adhesives. As will be explained in further detail below, in certain embodiments, the patch 10 is flexible so that it can be used to repair the wall portions W of material guides G having a range of diameters.

Figure 1:
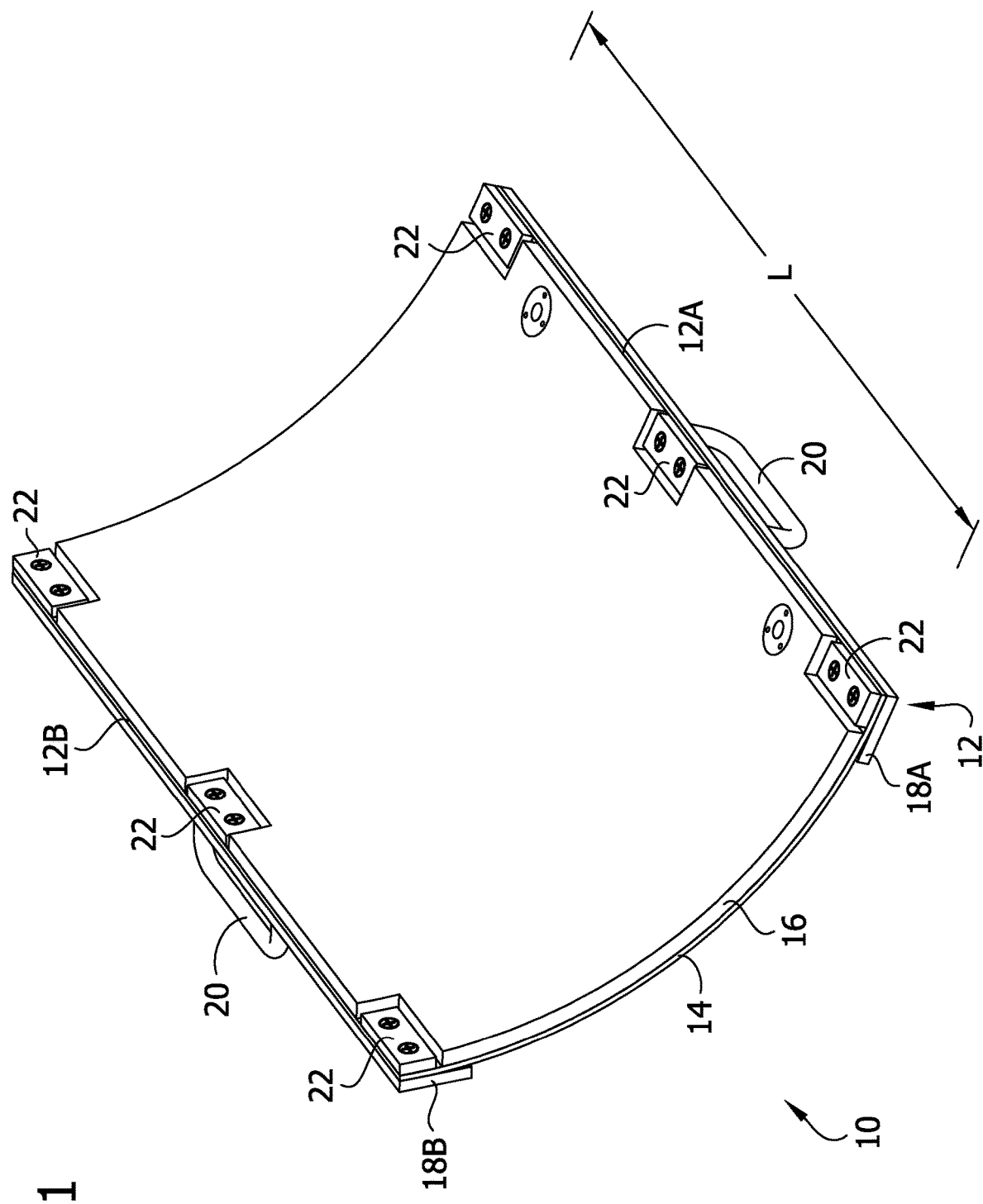
FIG. 1 is a perspective of a repair patch.
Figure 2:
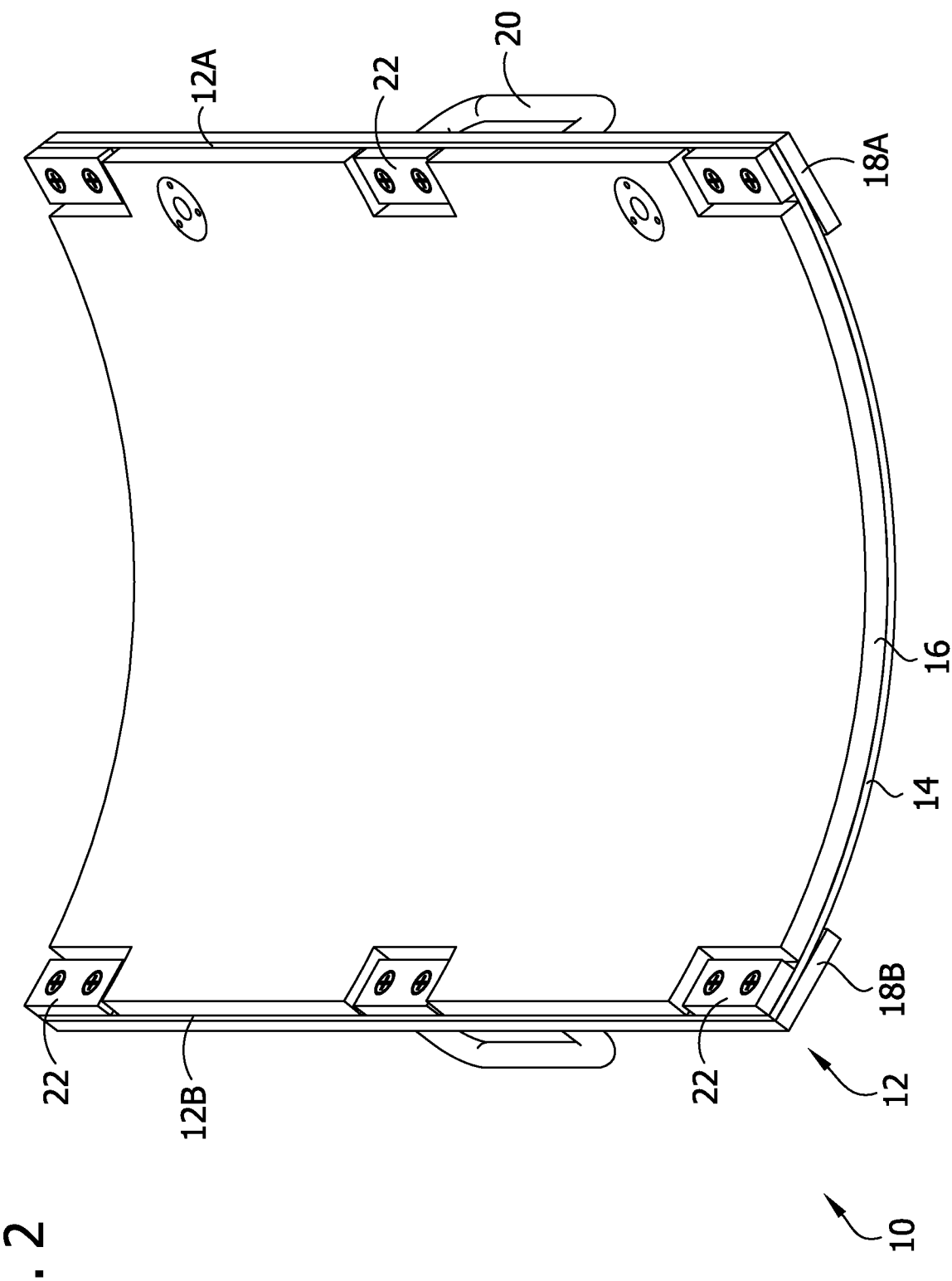
FIG. 2 is another perspective of the repair patch.
Figure 3:
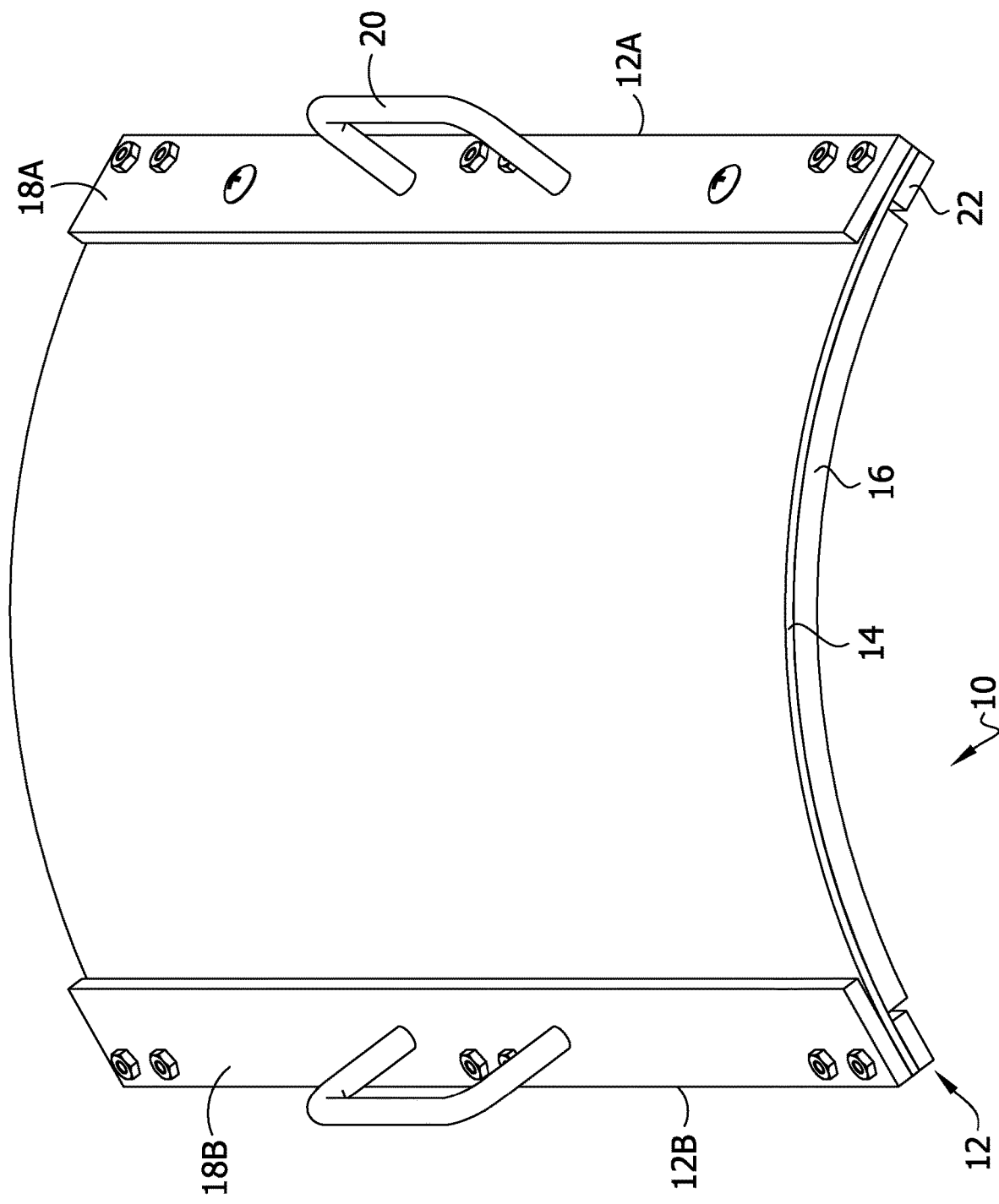
FIG. 3 is another perspective of the repair patch.
Figure 4:
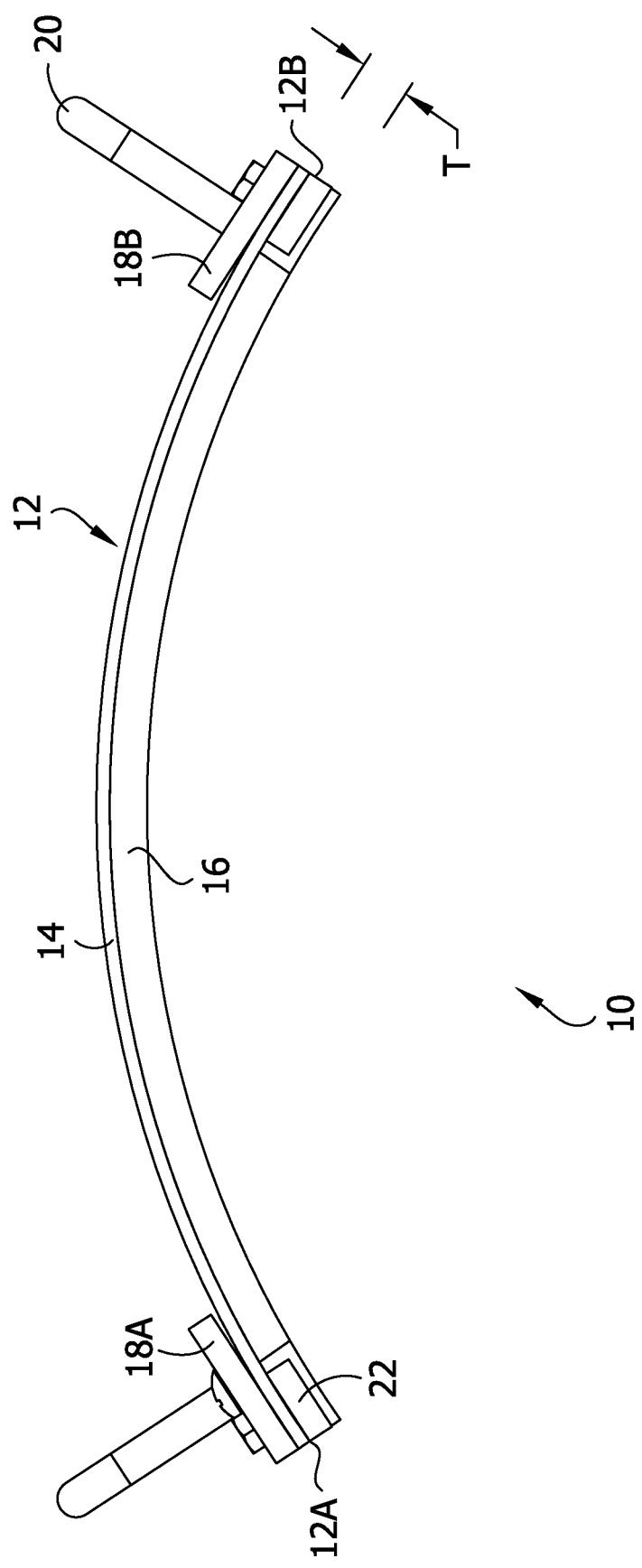
FIG. 4 is an end elevation of the repair patch.

The patch 10 comprises a patch body, generally indicated at 12, which is configured to be fitted to the wall portion W of any of a plurality of material guides G of differing diameters to cover and repair a hole (not shown) in the respective wall portion. The patch body 12 has a first end portion and a second end portion spaced apart along a length L (FIG. 1), a first longitudinal edge margin 12A and a second longitudinal edge margin 12B spaced apart along a width, and an inner surface and an outer surface spaced apart along a thickness T (FIG. 4). The patch body 12 is generally arcuate along the width. In one or more embodiments, the patch body 12 is generally flexible so that it can conform to the exterior surface of arcuate wall portions W of material guides G of differing diameters. For example, in one or more embodiments, the patch body 12 can conform to the exterior surface of material guides G having a nominal diameter in a range of from 6 inches to 20 inches. In an embodiment, the patch body is adjustable conform to the exterior surface of a range of material guides that at least includes all circular material guides having a nominal diameter between 10 inches and 15 inches (e.g., at least all circular material guides having a nominal diameter between 9 inches and 16 inches, at least all circular material guides having a nominal diameter between 8 inches and 17 inches, at least all circular material guides having a nominal diameter between 7 inches and 18 inches, at least all circular material guides having a nominal diameter between 6 inches and 20 inches).

Figure 5:
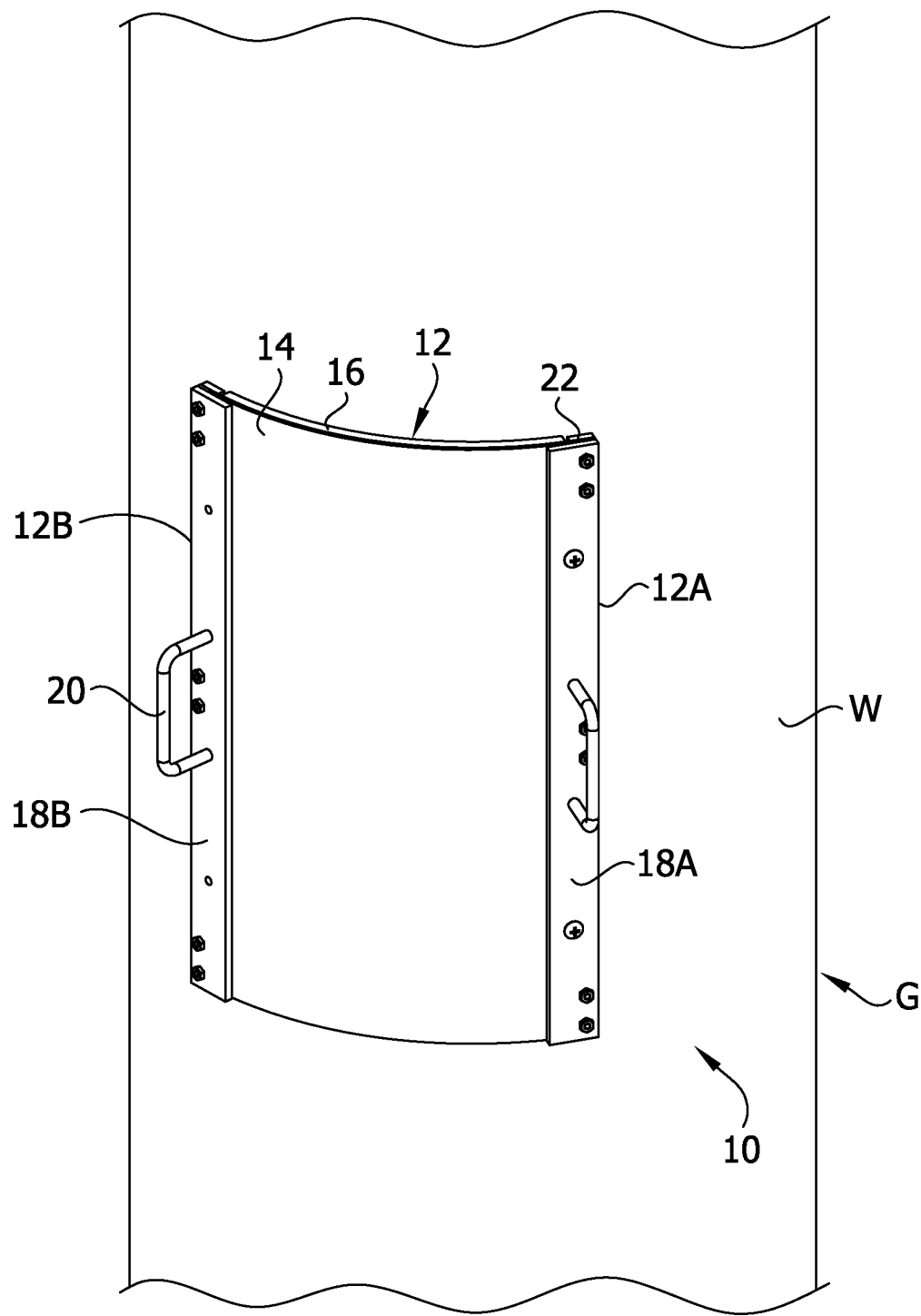
FIG. 5 is a perspective of the repair patch installed on a relatively large-diameter material guide.
Figure 6:
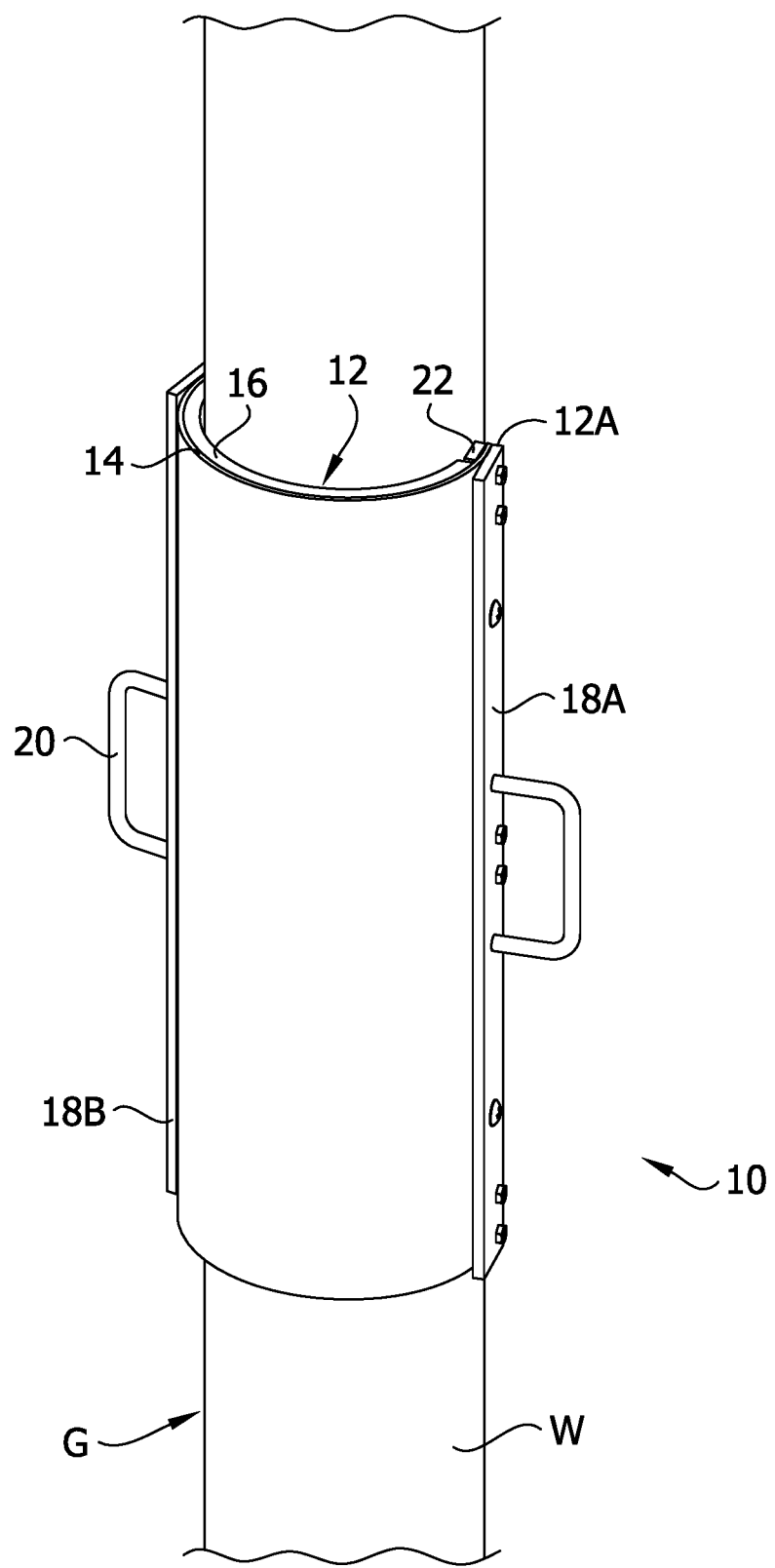
FIG. 6 is a perspective of the repair patch installed on a relatively small-diameter material guide.

In the illustrated embodiment, the patch body 12 is resiliently deformable to increase a widthwise radius of curvature of the patch body, whereby the patch body can be selectively adjusted to generally conform to a curvature of the wall portion W of any of the plurality of material guides G to cover a respective hole. For example, FIG. 6 illustrates the patch body 12 in a configuration in which it generally conforms to the exterior of a guide portion G having a relatively small diameter and FIG. 5 illustrates the patch body in a configuration in which it generally conforms to the exterior of a guide portion having a greater diameter. In FIG. 5, the patch body 12 has been resiliently deformed to accommodate the large diameter of the material guide G. If the illustrated patch 10 were removed from the guide G of FIG. 5, it would resiliently rebound such that a widthwise radius of curvature of the patch body 12 decreases.

In the illustrated embodiment, the patch body 12 is formed from two discrete layers 14, 16. However in other embodiments, it is contemplated that a patch body could be formed from a single layer or more than two layers. The illustrated patch body 12 comprises a resiliently bendable shell 14 (broadly, an outer layer) and a flexible wear-resistant liner 16 (broadly, an inner layer). The liner 16 is disposed on an inner surface of the shell 14 to define an inner surface of the patch body 12 that, after the patch 10 is installed, will be exposed to the flowing material through the hole in the wall portion W. The shell 14 defines a majority of the exterior surface of the patch body 12 in the illustrated embodiment. In one or more embodiments, the shell 14 is constructed from a material that can withstand the external environment of the material guide G.

The illustrated shell 14 extends generally along the full length L and width of the patch body 12. The shell 14 has a first longitudinal edge margin along the first longitudinal edge margin 12A of the patch body 12 and a second longitudinal edge margin along the second longitudinal edge margin 12B of the patch body. In general, the shell 14 is configured to provide structural integrity and environmental protection to the illustrated patch 10. It will be understood that a shell can be omitted from a patch in one or more embodiments. In the illustrated embodiment, the shell provides the patch body 12 with its bending resilience and the liner 16 is substantially compliant. In one or more embodiments, the liner can additionally or alternatively be formed from resilient material. In one or more embodiments, the shell 14 is formed from a metal (for example, galvanized steel, stainless steel, aluminum, or the like), a plastic, and/or a composite material.

In general, the illustrated patch body 12 comprises an inner surface formed from a wear-resistant material. As explained above, in the illustrated embodiment, the wear resistant inner surface is provided by a discrete liner 16 formed from a wear-resistant material, for example, a wear-resistant polymer, such as urethane, neoprene, nitrile, or Teflon. Other wear-resistant materials can also be used in certain embodiments. It is contemplated that the entire thickness of the patch body can be formed from the wear-resistant material in one or more embodiments.

In the illustrated embodiment, the liner 16 is separately attached to the shell 14. The wear-resistant liner 16 extends generally along substantially the entire length L and width of the patch body 12. (In other embodiments shown in FIGS. 9-12 and described further below, the liner extends along a majority of the width of the patch body but does not extend fully to the longitudinal edges thereof). The liner 16 has a first longitudinal edge margin along the first longitudinal edge margin 12A of the patch body 12 and a second longitudinal edge margin along the second longitudinal edge margin 12B. In an exemplary embodiment, the liner 16 is formed from urethane. The urethane is fully cured before the patch body 12 is fitted onto the wall portion W of the material guide G to conform to the wall portion and cover the hole.

In the illustrated embodiment, the patch 10 comprises a first support bar 18A extending along the first longitudinal edge margin 12A of the patch body 12 and a second support bar 18B extending along the second longitudinal edge margin 12B. Each support bar 18A, 18B is located on an exterior surface of the patch body 12 (e.g., an exterior surface of the shell 14). In the illustrated embodiment, a handle 20 is attached to each support bar 18A, 18B for manipulating the repair patch 10 during use. In another embodiment shown in FIGS. 11-12, only a single handle is used. In one or more embodiments, each support bar 18A, 18B is connected to the shell 14 by one or more mechanical fasteners (e.g., screws, rivets, etc.). As will be explained in further detail below, the same fasteners can be used to secure other components (e.g., the liner 16) to the shell 14 in one or more embodiments.

In the illustrated embodiment, the first longitudinal edge margin of the liner 16 is attached to the first longitudinal edge margin of the shell 14 along the first longitudinal edge margin 12A of the patch body 12 and the second longitudinal edge margin of the liner is unattached to the second longitudinal edge margin of the shell along the second longitudinal edge margin 12B of the patch body. More specifically, one or more mechanical fasteners extends from a first end portion connected to the first longitudinal end portion of the liner 16, through the shell 14, to a second end portion that is connected to the first support bar 18A. For example, a screw extends from the support bar 18A through the shell 14 and is fastened in or to the first longitudinal edge margin of the liner 16. Keeping the second longitudinal edge margin of the liner 16 unattached to the shell 14 allows the wear-resistant liner to move with respect to the shell as the patch body 12 is deformed during installation. This free movement allows the patch body 12 to conform to wall portions W of guides G having different diameters or curvatures without an installer making adjustments to the configuration of the repair apparatus.

Figure 7:
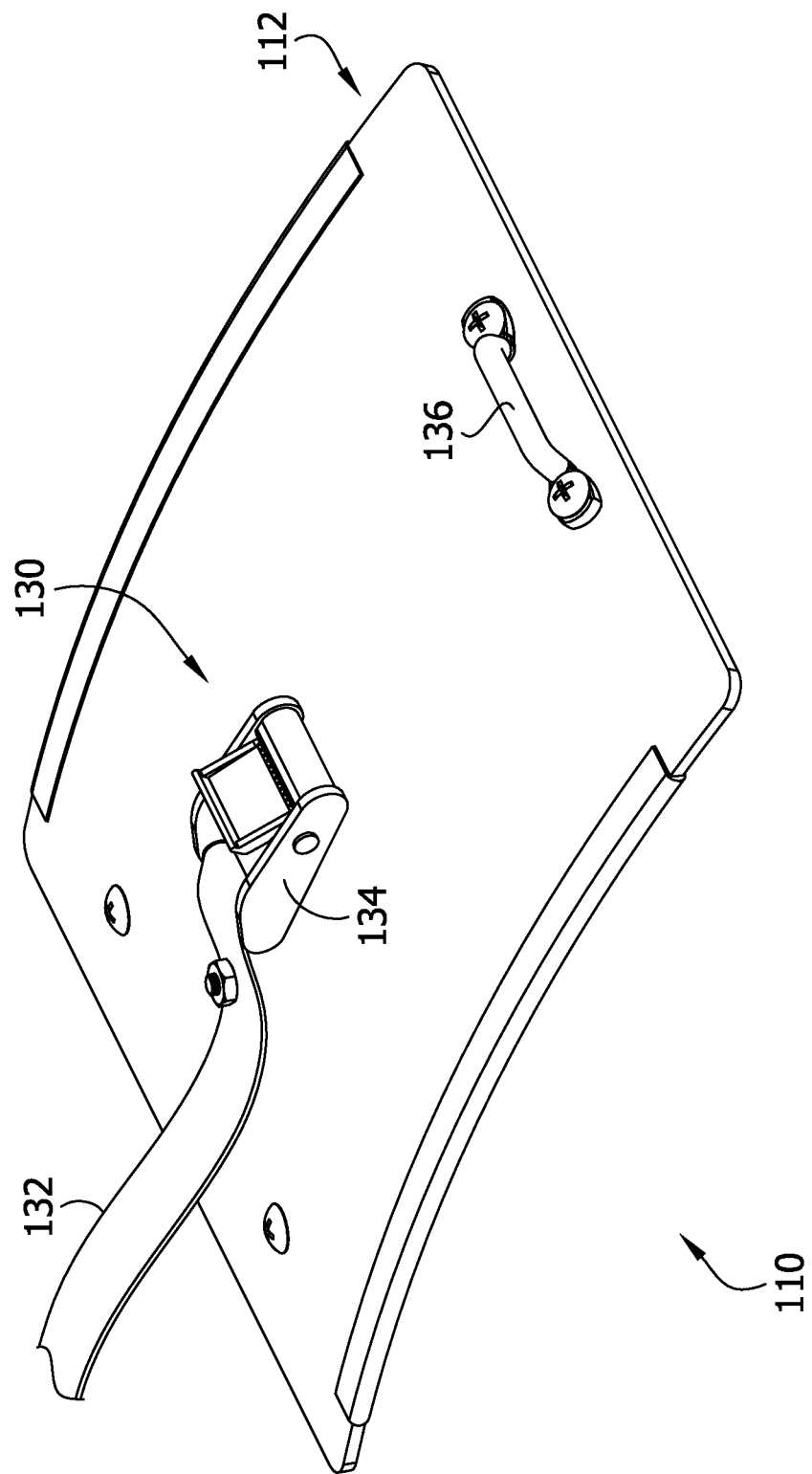
FIG. 7 is a perspective of another embodiment of a repair patch.
Figure 8:
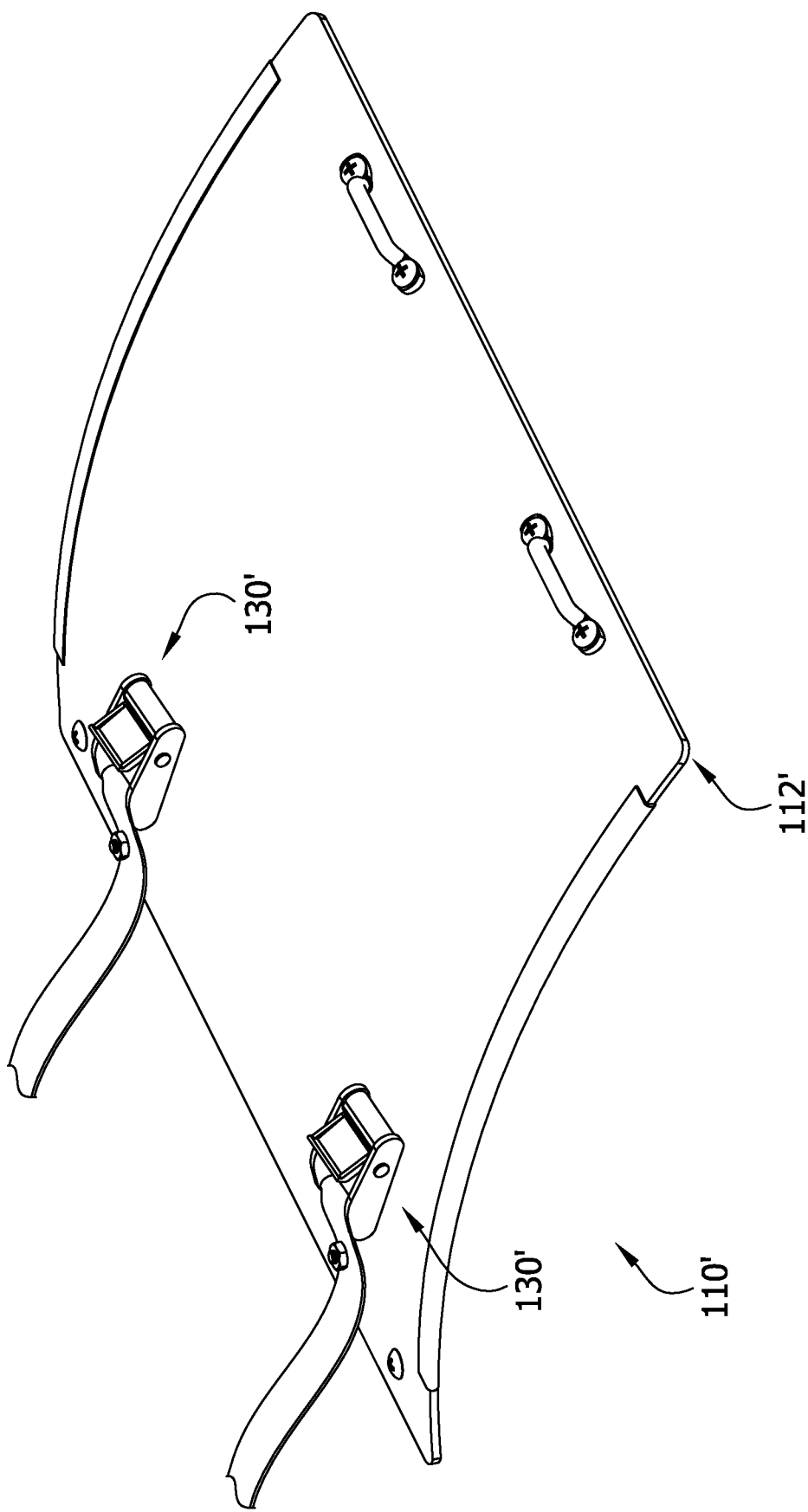
FIG. 8 is a perspective of another embodiment of a repair patch.

In general, the repair patch 10 can include one or more integral retainers configured to secure the patch body 12 onto the respective material guide G so that the patch body conforms to the curvature of the respective wall portion W and covers the respective hole. In this disclosure, "retainer" is used to describe an element that is generally configured to secure the patch body to a material guide in non-destructive fashion, without forming holes in the material guide like a mechanical fastener would or forming an adhesive, chemical, or thermal bond with material guide. In one or more embodiments, one or more "retainers" within the scope of the present disclosure can releasably secure the patch body 12 onto the material guide such that the patch body can be removed from the material guide after being attached without substantially damaging the material guide. In the illustrated embodiment, the patch 10 comprises a plurality of magnets 22 for securing the patch body onto a material guide G. Thus, the illustrated repair patch 10 is configured to be secured to a carbon steel wall portion W with magnets 22 (e.g., rare earth magnets). Other securement mechanisms can be used in other embodiments without departing from the scope of the invention. For example, FIGS. 7 and 8 show other embodiments of a repair patch 110, 110' that use one or more integral strap assemblies 130, 130' to secure the patch onto a wall portion, as will be described in further detail below.

Referring again to FIGS. 1-6, in one or more embodiments, the patch 10 comprises at least one magnet 22 that is connected to the patch body 12 and configured to fixedly retain the patch body on the wall portion W to cover the hole. The illustrated embodiment comprises a plurality of magnets 22 at spaced apart locations along the length L and width of the patch body. More specifically, the patch 10 comprises a first set or row of magnets 22 spaced apart along the first longitudinal edge margin 12A of the patch body 12 and a second set or row of magnets spaced apart along the second longitudinal edge margin 12B. A central region of the patch body 12 between the first and second longitudinal edge margins 12C thereof is free of magnets. Thus, the magnets 22 are arranged on the patch body 12 to be spaced apart around the perimeter of a hole (e.g., spaced apart longitudinally along opposite parallel sides of a hole) in the pipe when the patch 10 is installed, in one or more embodiments.

In the illustrated embodiment, three magnets 22 are fastened to each support bar 18A, 18B along each of the respective longitudinal edge margins 12A, 12B of the patch body 12. More specifically, one or more mechanical fasteners extends from a first end portion connected to the respective magnet 22, through the shell 14, to a second end portion that is connected to the respective support bar 18A, 18B. For example, a screw extends from the support bar 18A through the shell 14 and is fastened in or to the respective magnet 22. It is also contemplated that, in one or more embodiments, a single elongate magnet strip can extend along each longitudinal edge margin of a patch body.

As explained above, in one or more embodiments repair patches can include retainers other than or in addition to magnets for fixedly retaining a repair patch on a material guide. Referring again to FIG. 7, the material guide 110 includes a strap assembly 130 secured to a patch body 112 that can have any of the features of the patch body 12 described above. The strap assembly 130 comprises a strap 132 having a proximal portion attached to an exterior surface of the patch body 112 and a free end portion (not shown). The illustrated strap assembly 130 further comprises a strap retainer 134 secured to the exterior surface of the patch body 112. Finally, a strap guide 136 is attached to a longitudinal edge margin of the patch body 112 for guiding the free end portion of the strap toward the strap retainer. During use, the free end portion of the strap 132 is configured to be routed around a perimeter of the material guide G, through the strap guide 136, and through the strap retainer 134. The strap retainer is configured to hold the strap 132 to in tension so that the strap assembly 130 girds the patch 110 on the material guide G to secure the patch body onto the wall portion W.

It will be appreciated that any number of strap assemblies can be used to secure a repair patch on a material guide G. For example, FIG. 8 depicts a repair patch 110' that includes two strap assemblies 130' spaced apart along the length of the patch body 112', and each is substantially identical to the strap assembly 130 of FIG. 7.

Referring again to FIGS. 1-6, in an exemplary embodiment of a method of installing the repair patch 10, one person cleans an area around hole in the exterior of the guide G, removing any previous repair materials such as tape, wire, adhesives and so on. The material guide being repaired may be referred to as the "host material guide" for the repair patch 10. The area where the magnets 22 magnetically secure the repair patch to the wall portion of the guide is suitably relatively smooth for best magnet adhesion. In one or more embodiments, the installer places the patch body 12 directly over the hole in the wall portion W, with length L of the patch body oriented generally parallel with the guide run (e.g., parallel to the longitudinal axis or conveying direction of the guide G). Handle(s) 20 make installation and removal easy for one person without using tools. Using the handles 20, the installer can bend or deform the patch body 12 to adjust the curvature to match the curvature of the guide G. When the patch 10 is placed into position, the magnets 22 magnetically attach the patch body 12 to the wall portion W, and the patch body covers the hole.

After the patch 10 is secured to the material guide G by the magnets 22, the repaired material guide is free of any adhesive bond between the wall portion and the patch body. The magnets 22 (or strap assemblies 130, 130') can hold the patch 10 in place for as long as is required. The urethane liner 16 is exposed to an interior of the material guide through the hole, and provides a wear-resistant surface along which material flowing through the guide can slide.

Figure 9:
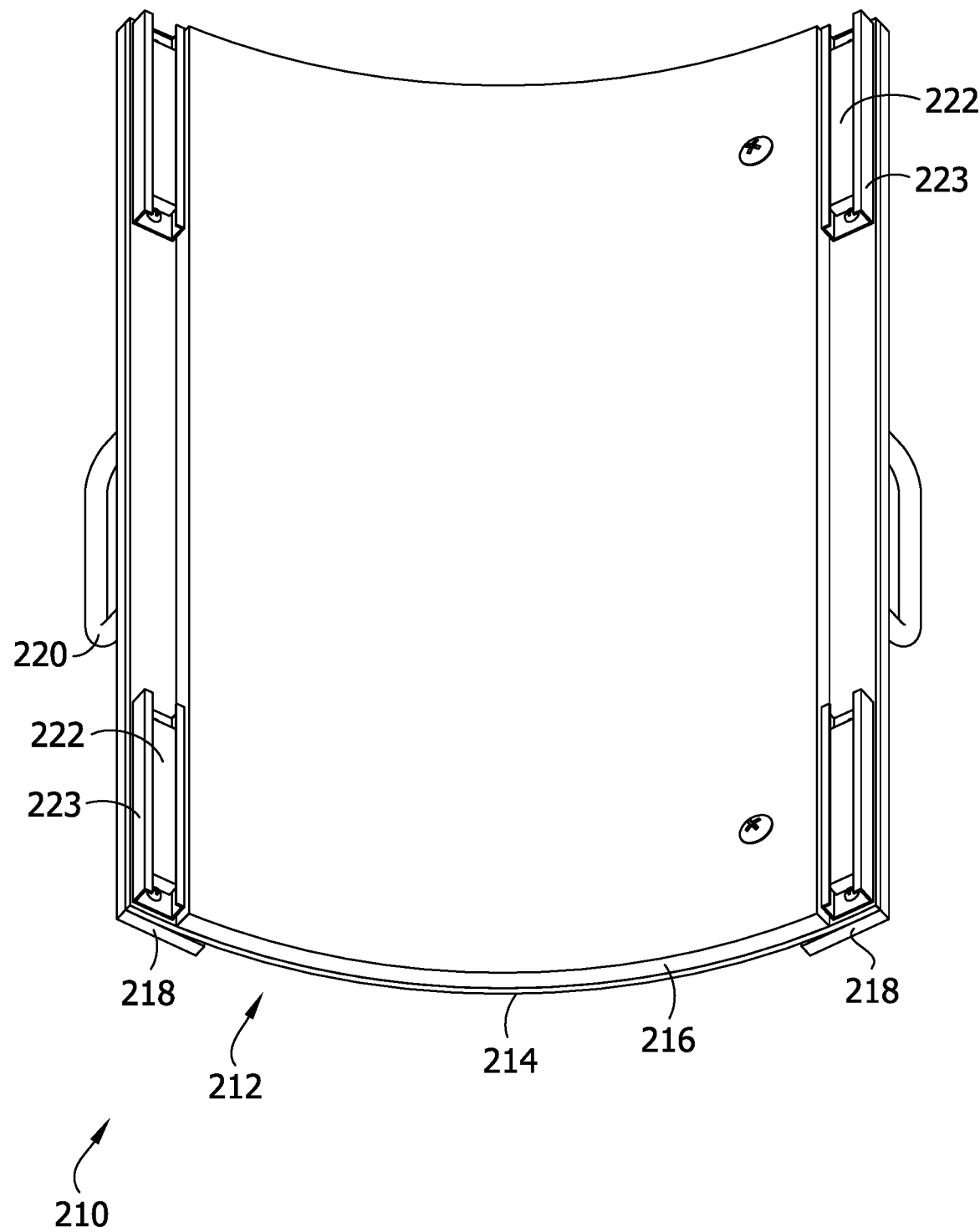
FIG. 9 is a perspective of another embodiment of a repair patch.
Figure 10:
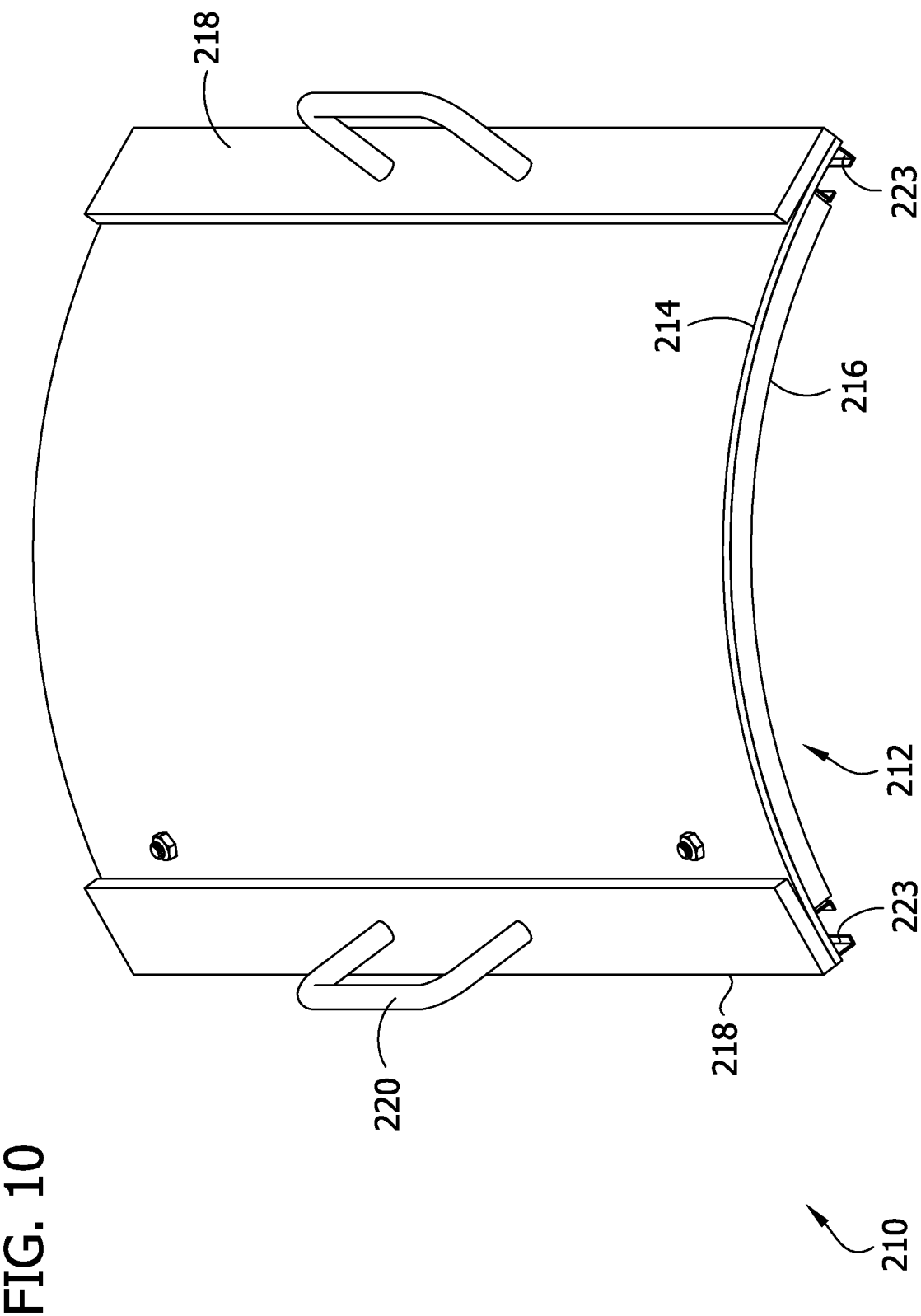
FIG. 10 is another perspective of the repair patch of FIG. 9.

Referring to FIGS. 9 and 10, another embodiment of a patch 210 comprises a patch body 212 comprising an outer shell 214 and an inner wear-resistant liner 216 that can have any of the features of the shells and liners described above. As explained above, the illustrated liner 216 does not extend along the entire width of the patch body 212. Instead the liner 216 comprises longitudinal edge margins that are recessed laterally inward slightly from the longitudinal edges of the shell 214. Still, the longitudinal edge margins of the liner 216 are located adjacent the longitudinal edge margins of the patch body 212. Like the patches discussed above, one of the longitudinal edge margins of the liner 216 is unattached to accommodate changes in the curvature of the patch body 212 without wrinkling. In the illustrated embodiment, the attached longitudinal edge margin of the liner 216 is attached directly to the shell 214 by a threaded fastener (the fastener is not attached to the support bar).

As above, the patch 210 includes a pair of support bars 218 along the longitudinal edge margins of the patch body. A U-shaped handle 220 is mounted on the exterior of each support bar 218 in the illustrated embodiment. In addition, a pair of magnets 222 is connected to each support bar, and the support bar supports the respective magnets on the patch body 212. In the illustrated embodiment, each magnet 222 is received in a C-shaped section of channel 223 (e.g., a rail or a track) mounted on the interior surface of the shell 214. Screws connect each channel section 223 to the respective support bar 218 without penetrating the exterior side of the support bar (unlike the screws that attach the magnets 22 discussed above). Each magnet is retained in the respective channel section 223 between a pair of screw heads in certain embodiments. In the illustrated embodiment, a channel section 223 and a magnet 222 is located at each end portion of each longitudinal edge margin of the patch body. In other embodiments, other arrangements of magnets and/or channel sections can be used.

Figure 11:
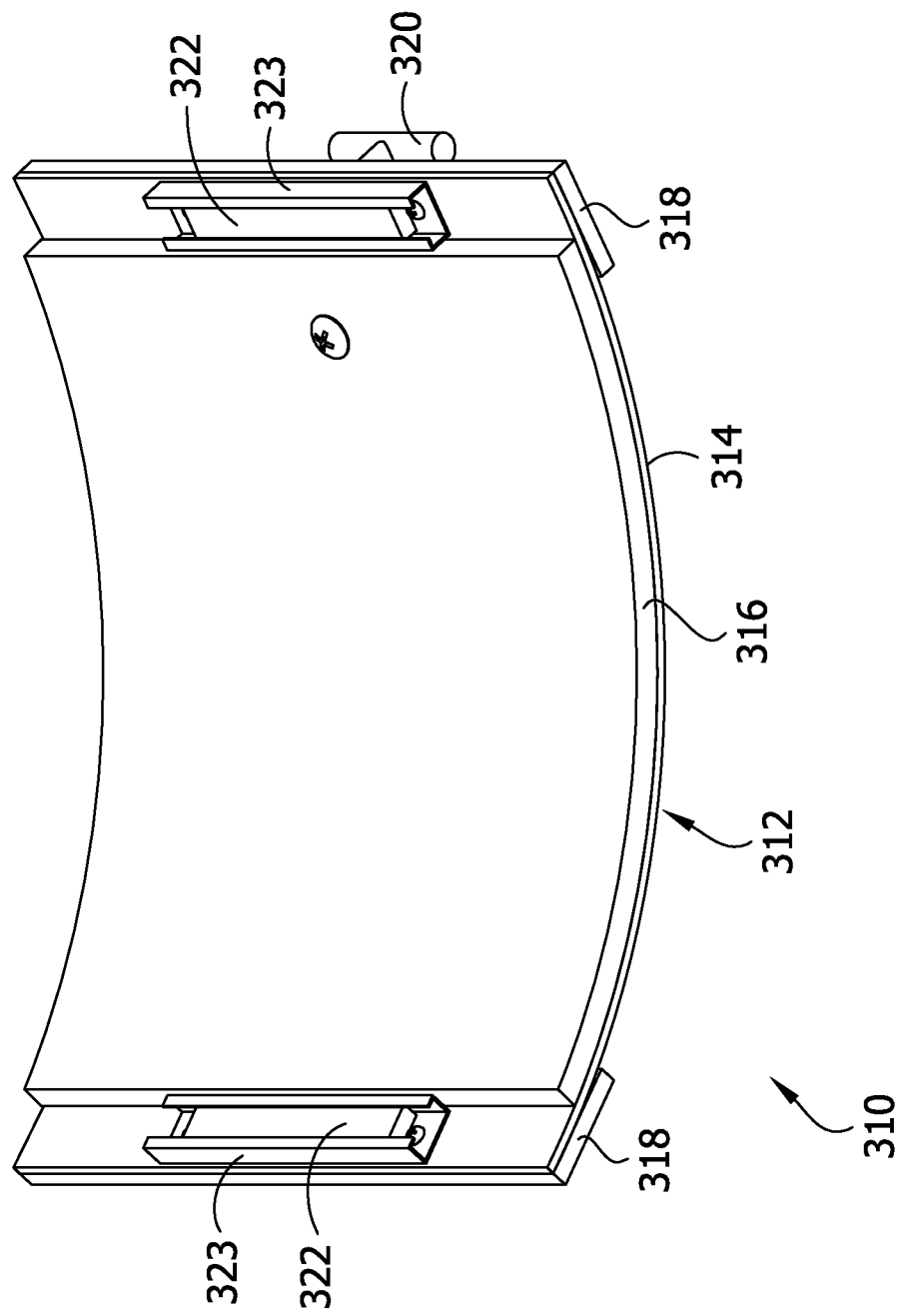
FIG. 11 is a perspective of another embodiment of a repair patch.
Figure 12:
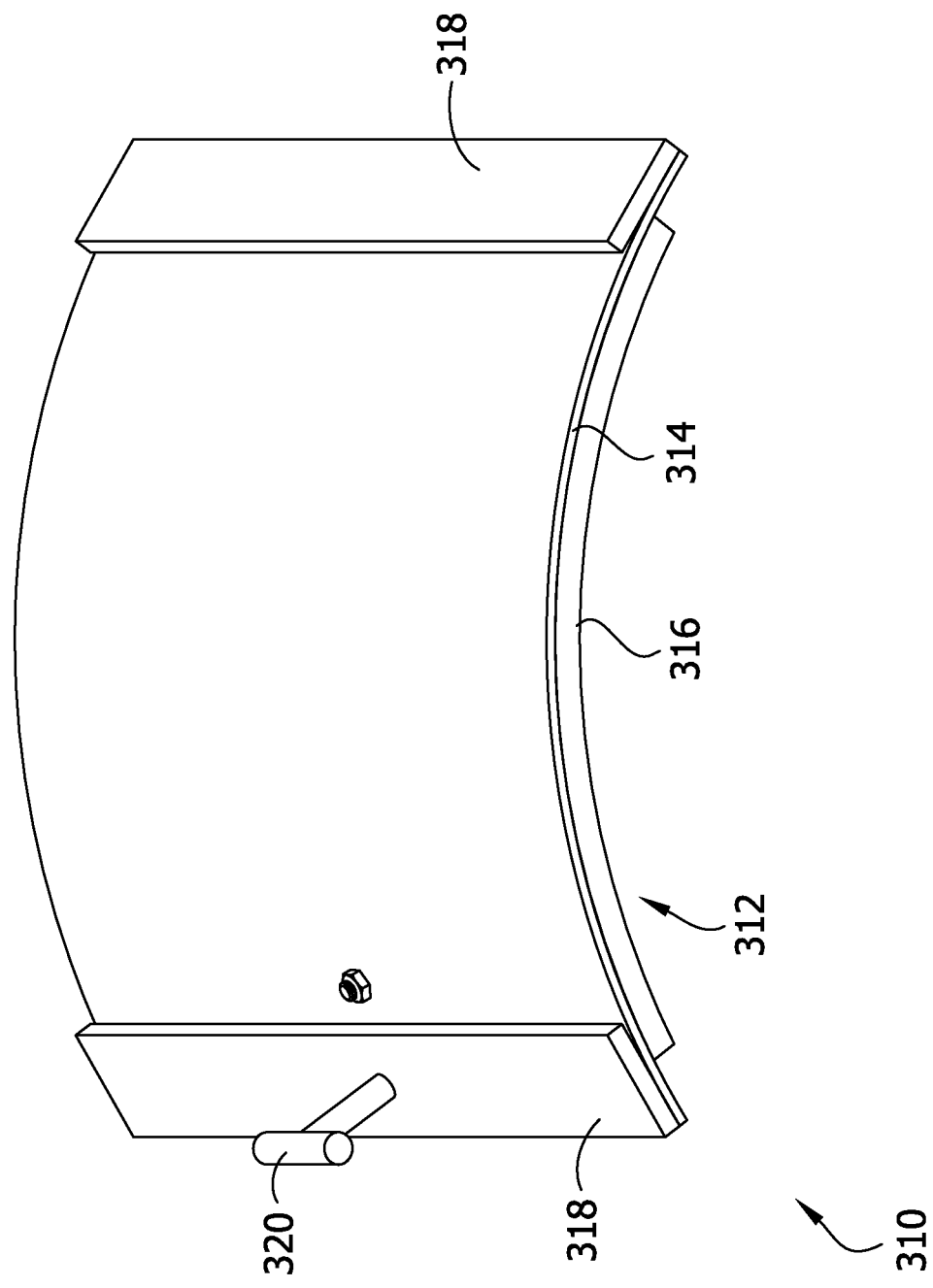
FIG. 12 is another perspective of the repair patch of FIG. 11.

For example, referring to FIGS. 11 and 12, in one embodiment of a patch 310 comprising a patch body 312 having a shorter length than the patch body 212, a single channel section 323 and a single magnet 322 is attached to the patch body at about the middle of each longitudinal edge margin of the patch body. The patch 310 also differs from the patches discussed above in that a single T-bar-type handle 320 is attached to one of the support bars 318, while the other support bar has no handle. In addition, only a single screw is used to secure the attached longitudinal edge margin of the liner 316 to the shell 314.

Various embodiments of patches for repairing curved wall portions of material guides have been described. It will be understood that the size of the patch body can vary in accordance with the size and shape of the curved wall portion and/or the size and shape of the hole in the wall portion. For example, in one or more methods of repair in the scope of this disclosure, the patch body is custom-sized based on measured or known dimensions of the material guide wall portion and/or hole therein. Additionally, patches can be manufactured to have standard patch body sizes in one or more embodiments. (As explained above, flexible patch bodies can be used to repair a range of different material guides). In general, it is contemplated that in certain embodiments of patches within the scope of this disclosure, the patch body has a length in an inclusive range of from about 3 inches to about 36 inches (e.g., from about 4 inches to about 24 inches, from about 5 inches to about 18 inches, from about 6 inches to about 12 inches) and a width of from about 3 inches to about 36 inches (e.g., from about 4 inches to about 24 inches, from about 5 inches to about 18 inches, from about 6 inches to about 12 inches). Patch bodies of other dimensions can also be used without departing from the scope of the invention. In certain embodiments, the length of a patch body can be about the same as the width of the patch body, the length of the patch body can be greater than the width of the patch body, or the length of the patch body can be less than the width of the patch body.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A repair apparatus configured to repair a hole in a curved steel wall portion of any of a plurality of material guides of different diameters, the repair apparatus comprising:
   a patch body having a first end portion and a second end portion spaced apart along a length and a first longitudinal edge margin and a second longitudinal edge margin spaced apart along a width, the patch body being configured to be fitted onto the wall portion of any of the plurality of material guides whereby the patch body substantially conforms to the wall portion and covers the hole; and
   at least one magnet connected to the patch body and configured to retain the patch body on the wall portion to cover the hole;
   wherein the patch body has an inner surface configured for engagement with the wall portion and an outer surface opposite the inner surface;
   wherein the patch body has an undeformed shape in a resting position in which the patch body rests on the outer surface;
   wherein the patch body is configured to be bent from the undeformed shape to a conforming shape that conforms to a curvature of the wall portion;
   wherein the patch body and the at least one magnet are configured so that the at least one magnet can independently hold the patch body against the wall portion with sufficient force to substantially seal the hole against egress of at least one type of dry fluidizable material through an interface between the patch body and the wall portion;
   wherein the patch body is configured to be selectively removed from the wall portion after being bent to the conforming shape;
   wherein the patch body is configured to automatically return to the undeformed shape when the patch body is positioned in the resting position after being bent to the conforming shape and removed from the wall portion.

2. The repair apparatus as set forth in claim 1, wherein the at least one magnet comprises a plurality of magnets at spaced apart locations along the length and width of the patch body.

3. The repair apparatus as set forth in claim 2, wherein the plurality of magnets comprises a first set of magnets spaced apart along the first longitudinal edge margin of the patch body and a second set of magnets spaced apart along the second longitudinal edge margin.

4. The repair apparatus as set forth in claim 2, wherein the patch body has a central region between the first and second longitudinal edge margins that is free of magnets.

5. The repair apparatus as set forth in claim 1, wherein the patch body is flexible.

6. The repair apparatus as set forth in claim 5, wherein the inner surface of the patch body is formed from a wear-resistant polymer comprising one of a urethane, a neoprene, a nitrile, and a polytetrafluoroethylene.

7. The repair apparatus as set forth in claim 5, wherein the patch body comprises a layer of a wear-resistant polymer.

8. The repair apparatus as set forth in claim 7, wherein the wear-resistant polymer is fully cured before the patch body is fitted onto the wall portion of any of the plurality of material guides to conform to the wall portion and cover the hole.

9. A repaired material guide comprising a host material guide comprising a curved wall portion having a hole therein and the repair apparatus of claim 8, wherein the repair apparatus is secured to the material host guide by the at least one magnet and the repaired material guide is free of an adhesive bond between the host material guide and the patch body, wherein the layer of wear-resistant polymer is exposed to an interior of the host material guide through the hole.

10. A repair apparatus configured to repair a hole in a curved wall portion of any of a plurality of material guides of different diameters, the repair apparatus comprising:
a patch body having a first end portion and a second end portion spaced apart along a length and a first longitudinal edge margin and a second longitudinal edge margin spaced apart along a width, the patch body being substantially arcuate along the width and being deformable to adjust a widthwise radius of curvature of the patch body whereby the patch body can be selectively adjusted to generally conform to a curvature of the wall portion of any of the plurality of material guides to cover the hole; and
at least one retainer attached to the patch body, the at least one retainer being configured to secure the patch body onto any of the plurality of material guides so that the patch body conforms to the curvature of the wall portion and covers the hole;
wherein the patch body comprises a wear-resistant liner and the wear-resistant liner is releasably connected to the retainer.

11. The repair apparatus as set forth in claim 10, wherein the patch body comprises a resiliently flexible shell having a first longitudinal edge margin adjacent the first longitudinal edge margin of the patch body and a second longitudinal edge margin adjacent the second longitudinal edge margin of the patch body, the shell defining an outer surface of the patch body.

12. The repair apparatus as set forth in claim 11, wherein the wear-resistant liner has a first longitudinal edge margin adjacent the first longitudinal edge margin of the patch body and a second longitudinal edge margin adjacent the second longitudinal edge margin of the patch body, the liner defining an inner surface of the patch body.

13. The repair apparatus as set forth claim 11, wherein the shell comprises one of a metal, a plastic, and a composite.

14. The repair apparatus as set forth in claim 10, wherein the wear-resistant liner is formed from at least one of urethane, neoprene, nitrile and polytetrafluoroethylene.

15. The repair apparatus as set forth in claim 10, wherein the at least one retainer comprises at least one magnet.

16. The repair apparatus as set forth in claim 10, wherein the repair apparatus further comprises a first support bar extending along the first longitudinal edge margin of the patch body and a second support bar extending along the second longitudinal edge margin of the patch body.

17. The repair apparatus as set forth in claim 16, wherein the at least one retainer comprises at least one magnet secured to each of the first and second support bars.

18. A repair apparatus configured to repair a hole in a curved wall portion of any of a plurality of material guides of different diameters, the repair apparatus comprising:
a patch body having a first end portion and a second end portion spaced apart along a length and a first longitudinal edge margin and a second longitudinal edge margin spaced apart along a width, the patch body being substantially arcuate along the width and being deformable to increase a widthwise radius of curvature of the patch body whereby the patch body can be selectively adjusted to substantially conform to a curvature of the wall portion of any of the plurality of material guides to cover the hole; and
at least one retainer attached to the patch body, the at least one retainer being configured to secure the patch body onto any of the plurality of material guides so that the patch body conforms to the curvature of the wall portion and covers the hole;
wherein the patch body comprises a shell having a first longitudinal edge margin adjacent the first longitudinal edge margin of the patch body and a second longitudinal edge margin adjacent the second longitudinal edge margin of the patch body;
wherein the patch body comprises a wear-resistant liner having a first longitudinal edge margin adjacent the first longitudinal edge margin of the patch body and a second longitudinal edge margin adjacent the second longitudinal edge margin of the patch body;
wherein the first longitudinal edge margin of the liner is attached to the first longitudinal edge margin of the shell and the second longitudinal edge margin of the liner is unattached to the second longitudinal edge margin of the shell.

19. The repair apparatus as set forth in claim 18, wherein the first longitudinal edge margin of the liner is secured to the shell by a fastener that extends through the shell.

* * * * *